United States Patent [19]
Muller

[11] 3,742,474
[45] June 26, 1973

[54] FLAME DETECTOR

[75] Inventor: Peter Muller, Oetwil a. See, Switzerland

[73] Assignee: Cerberus AG, Mannedorf, Switzerland

[22] Filed: Apr. 7, 1971

[21] Appl. No.: 131,898

[30] Foreign Application Priority Data
Mar. 4, 1971 Switzerland.................. 3248/71

[52] U.S. Cl.......... 340/228.2, 250/83.3 R, 250/207, 328/6
[51] Int. Cl...................... G08b 17/12, H01j 39/00
[58] Field of Search.............. 340/228.2, 227, 228; 328/2, 6; 250/83.3 UV, 83.6, 217 F, 207

[56] References Cited
UNITED STATES PATENTS

| 3,156,908 | 11/1964 | Kopan et al. | 340/228.2 |
| 3,344,277 | 9/1967 | Smith et al. | 250/83.6 |
| 2,994,859 | 8/1961 | Klein | 340/228.2 |
| 2,811,711 | 10/1957 | Cade et al. | 340/228.2 |
| 3,487,222 | 12/1969 | Martens | 250/207 X |
| 3,514,209 | 5/1970 | McGhee et al. | 250/207 X |
| 3,531,692 | 9/1970 | Gilbert et al. | 340/228.2 X |

Primary Examiner—John W. Caldwell
Assistant Examiner—Scott F. Partridge
Attorney—Flynn & Frishauf

[57] ABSTRACT

The output from a photosensitive transducer, such as a photo diode or the like, exposed to a flame, is applied to a circuit which is capable of filtering out regularly recurring a-c components to distinguish the randomly occurring components upon flame detection from regularly recurring variations of light sensed by the transducer, for example due to reflections from rotating machines, line disturbances and the like. The circuit includes a demodulator and filter, having a pass range of about 2–40 Hz to demodulate the signal, and a further detector circuit detecting randomly recurring components within a lower frequency range, for example 1 Hz or less and providing an output signal if a certain threshold is exceeded. Signals arising in the circuit can be used to additionally control the sensitivity of the flame-sensitive detector.

23 Claims, 6 Drawing Figures

Patented June 26, 1973      3,742,474

FLAME DETECTOR

Flame detectors have been proposed to automatically indicate the presence of flames, for example to act as fire alarms, or to supervise control burning, for example in furnaces or the like. The flame detectors usually include a photosensitive transducer, such as a photo cell, a photo diode, or a photo resistance which is located to be sensitive to the radiation emitted by the flame, for example within the infrared or ultraviolet spectral region, and to provide an electrical output signal. A circuit is then connected to the photoelectric sensing element which is so arranged that an alarm signal, or a control signal is provided if a flame is present, or not present, in the path of radiation to the photo cell.

In actual operating practice it is difficult to avoid stray and spurious radiation from impinging on the photosensitive element. Besides the radiation from the flame, other spurious radiation such as sunlight, radiation from lamps or other infrared sources may be present. The flame detector must therefore distinguish between radiation received from the flame and from spurious other radiation, similar to noise. The flame detector must therefore be made to be specifically sensitive to the characteristics of the radiation from the flames in order to provide for effective discrimination from random radiation.

One known arrangement discriminates between radiation from a flame and from spurious radiation by selecting the higher proportion of infrared radiation which is present when flames arise due to a fire. A red-sensitive and blue-sensitive photo cell are provided, serially connected, and the electrical circuit is so arranged that an alarm signal is derived only when the red/blue ratio exceeds a predetermined value. Flame detectors of this type can give erroneous alarms when strong infrared radiation is applied thereto. If, however, spurious radiation having a heavy blue content is applied, then no alarm is given regardless of the presence of a heavy infrared content in extreme cases, and in any event, the sensitivity of the device to radiation from flames is substantially reduced.

Another known arrangement utilizes the flow frequency flicker which is typical to flames to distinguish from spurious radiation. The electrical circuit includes a frequency sensitive filter passing frequencies only within a certain predetermined range, for example 5–25 Hz or 2–40 Hz. Arrangements of this type may, however, be subject to spurious response by reflection from radiation occurring on movable or rotating parts having, by chance, a similar frequency of recurrence; or they may be activated by fluorescent lamps or other lamps which have flicker. It has been proposed to reduce spurious responses by making the flame sensitive element more responsive to radiation from a flame, for example by use of filters in the infrared region and responsive to the wave lengths most likely to arise due to flames, as well as by filters suppressing the wave lengths derived from the most usual interfering radiation sources. This, however, is a solution which is satisfactory only in a limited way, since frequently infrared radiation is reflected by moving, or rotating portions of equipment and machinery so that erroneous indications are also obtained.

It is an object of the present invention to provide a flame detector in which the characteristics of flames can be utilized themselves to decrease false alarms, and responses to spurious radiation, in order to provide a flame detector which is highly reliable and essentially insensitive to radiation from spurious sources, so that rapid response can be obtained.

SUBJECT MATTER OF THE PRESENT INVENTION

Briefly, a photoelectric transducer responsive to flame radiation is connected to an electrical circuit which includes a discriminator arranged to discriminate between regularly recurring components of signals derived from the transducer and randomly recurring components; and further, a detector sensitive to the randomly recurring components within a predetermined low-frequency range to provide an alarm or a control signal if and only if the randomly recurring components exceed a certain threshold value. Regularly recurring components of the signal from the flame transducer therefore will not cause the circuit to respond.

The invention is based on the realization that the low-frequency flicker from flames is not regular, or periodic. A fire usually is characterized by flames which start as single tongues of fire from the source of the fire, the various tongues of the flame providing light pulses. The sequence of these various light pulses is such that they will lie within the above-mentioned low-frequency range; neither their amplitude, nor their recurrence is regular, however. There will be variations present, statistically, between the various tongues of flame from the fire. These statistical variations can be utilized to distinguish from noise or interfering radiation, for example reflections from rotating machinery, ventilators, or due to line frequency, all of which are regular and periodically recurring. The invention thus solves the problem of recognizing flames by distinguishing flame radiation from interfering radiation, in that the periodic, regularly recurring radiation within a preferred low-frequency range is separated from the non-periodic, randomly recurring portion. An alarm is given only if the randomly recurring portion exceeds a certain predetermined threshold value.

The randomly recurring irregular portion of the signal can be separated from the regularly recurring periodic portion by amplitude demodulation or frequency demodulation; an aboslute value of the irregular, randomly recurring portion can be used to effect alarm or control functions; or a relative value can be used, that is, a signal in which the proportion of randomly recurring radiation to periodic radiation is utilized for alarm or control functions. Additionally, such porportions can be utilized to control the sensitivity of the transducer, or the circuit as a whole, as desired.

DRAWINGS

Figure 1:
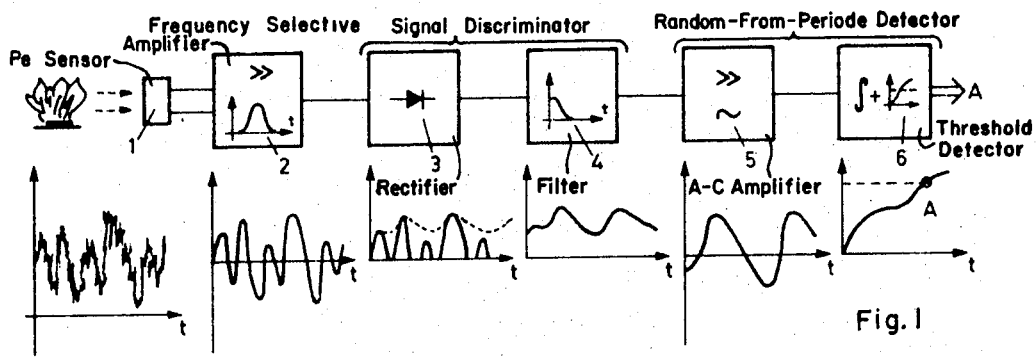
FIG. 1 is a schematic block circuit of a flame detector in accordance with the present invention, with signals occurring in the various blocks indicated therebelow.

Radiation from a fire is sensed by a photoelectric sensing element 1 which is a photoelectric transducer providing an electrical output signal, of known construction, such as a photo cell, photo diode, photo resistance, photo transistor, or the like. A red or infrared filter can be interposed in front of the sensing surface of sensor 1 to contribute to suppression of noise radiation. More than one photoelectric sensing element can be used, the various sensors having different spectral sensitivity, and being arranged in series circuits, differential circuits, or the like. Spurious radiation of specific spectral composition can thus be suppressed, as known.

The output signal of the photosensitive element 1 includes an irregular mixture of various frequencies. It is applied to a frequency selective amplifier 2. The frequency pass band of this amplifier 2 is so selected that only those frequencies derived from a flame, which have the highest intensity and occur most frequently, are passed. A frequency band pass of, for example, from 5–25 Hz or 2–40 Hz is suitable. Steady state portions of received radiation, as well as undulations of higher frequencies, such as line frequencies (50 or 60Hz) are not passed by amplifier 2. Interference by uniform light, for example reflections derived from rapidly rotating machine elements, and apparatus driven by machinery, are thus filtered out and removed.

Erroneous alarms derived from reflections from slowly rotating, or oscillating elements could still be possible. This is inhibited by applying the output signal of the frequency selective amplifier 2 to a rectifying diode 3, and then to a low-pass filter 4 having an upper frequency pass band substantially below that of the amplifier 2, for example 1 Hz or less. Periodic radiation within the pass band of amplifier 2 will cause a uniform direct current potential to appear at the output of low pass filter 4. Flames, due to their random occurrence, will provide an alternating signal at the output of low-pass filter 4. A combination of flames and spurious signals will provide a d-c output with a superimposed a-c component. The combination of rectifier 3 and low-pass filter 4 thus have the function of an amplitude demodulator providing an alternating current output signal if and only if random, non-recurring radiation is received by photoelectric sensor 1.

The subsequent circuit includes an a-c amplifier 5 and an integrator and threshold detector 6. Circuits 5 and 6 separate the alternating current component of the signal from the direct current component of the signal derived from filter 4 and then provide an alarm signal if the alternating current signal persists for a predetermined period of time. Alternating current amplifier 5 has a lower frequency cutoff which is substantially below the upper frequency limit of low-pass filter 4. Threshold detector and integrator 6 can operate in various ways, for example by forming the effective value of the output signal of amplifier 5 by means of rectification, or use of half waves of one polarity, in order to provide pulses upon exceeding a certain threshold value, and count of the pulses within units of time, or by means of other known arrangements.

If the various signals derived from sensor 1 are sufficiently great, the separate amplifier stages can be omitted. The amplifiers are then replaced by suitable corresponding frequency filters. Other apparatus than that shown and described can be used for amplitude demodulation.

Figure 2:
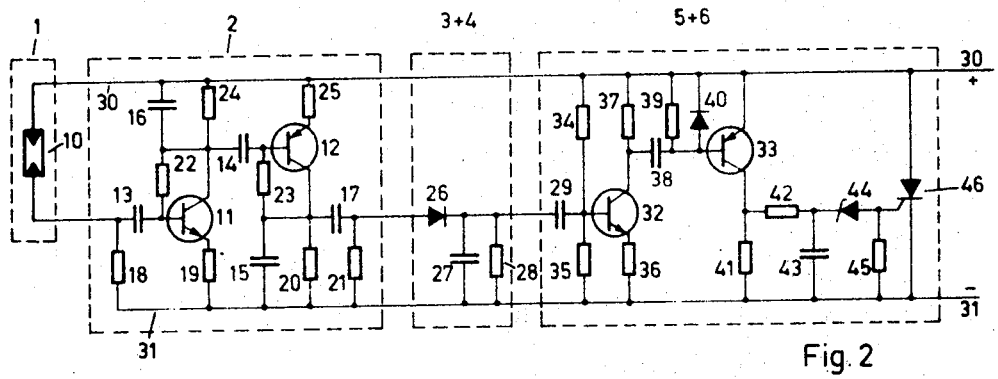
FIG. 2 is a schematic circuit diagram of a flame detector with amplitude demodulation.

A flame detector with amplitude demodulation is illustrated in detail in FIG. 2. A photo resistance 10 forms the photoelectric element 1. Photo resistance 10 is connected in series through a resistance 18 between a pair of d-c buses 30, 31. The junction point between photo resistance 10 and resistor 18 is connected over a condenser 13 to the base of a first transistor 11. Resistances 24, 19 and 22 form the collector, emitter, and base resistors, respectively. Condenser 16, connected between the collector of transistor 11 and bus 30 by-passes high frequencies and thus limits the high-frequency response. The voltage drop across the collector resistance 24 is coupled by means of condenser 14 to the base of second transistor 12 having collector, emitter, and base resistances formed of resistors 20, 25 and 23 respectively. Condenser 15 between the collector and bus 31 again limits the high-frequency response. Transistors 11 and 12 form a frequency-selective alternating current amplifier, having a lower frequency limit determined by the coupling condensers 13, 14 and 17 and an upper frequency limit determined by condensors 16 and 15. The output signal of the second transistor 12 is coupled by means of condenser 17 and resistance 21 to the combined amplitude demodulator 3 and 4.

Diode 26 forms the input to the amplitude demodulator. The output from diode 26 is connected to a parallel network formed of a condenser 27 and a resistance 28, forming a low-pass filter. To improve selectivity, other known low-pass filter circuits having a steeper characteristic for their frequency pass band can be used. The upper frequency limit of the low-pass filter must be so arranged that the frequencies applied thereto by amplifier 2 are absorbed, so that periodic oscillations with frequencies within the pass band of amplifier 2 provide, at the output of amplitude-demodulators 3 and 4, a direct current signal having as little ripple as possible.

The output signal from the amplitude demodulators 3 and 4 is applied over coupling condenser 29 to the base of a third transistor 32, having collector, emitter and base resistances 36, 37, 34 and 35, respectively. This stage of the network operates as an alternating current amplifier having a lower frequency limit which is selected to be lower than the highest limit of the frequency band of the amplitude demodulator. The output of the transistor 32 thus will only reflect the non-periodic, random flicker of flames providing a modulation signal to sensor 1. This output signal is applied by coupling condenser 38 to the base of a further transistor 33 having collector and base resistances formed of resistors 41, 39, respectively. A diode 40 is connected between the base and the positive bus 30, so that transistor 33 is conductive only during the negative half waves of the modulation swing applied thereto, thus successively charging a condenser 43 over a resistance 42, so long as modulating oscillations of very low frequencies are applied to transistor 33. The base-emitter voltage of transistor 33 forms a threshold potential.

When the charge on condenser 43 exceeds the Zener voltage of Zener diode 44, connected between resistance 42 and the control electrode of a thyristor, such as a silicon controlled rectifier (SCR) 46, then Zener diode 44 becomes conductive to fire the SCR 46. The SCR has its anode-cathode path connected across the supply buses 30, 31. Upon firing of the SCR 46, the current supplied over the buses 30, 31 to the flame detector rises suddenly; this increase in current can be detected by an alarm network, not shown, to provide an alarm or controller signal. An overcurrent, or current-sensitive relay may serve as such an alarm or control element. Resistance 45, connected to the gate electrode of SCR 46, is a holding and bypass resistor.

The flame detector in accordance with the circuit of FIG. 2 supplies an alarm signal only when the photo resistance 2 is subjected to differences in light intensity within a certain low-frequency range and which have randomly occurring (in time) amplitude excursions. A purely periodic undulation in light sensed by sensor 1 provides to the base of transistor 32 only a small input voltage, so that no alarm will be given.

Figure 3:
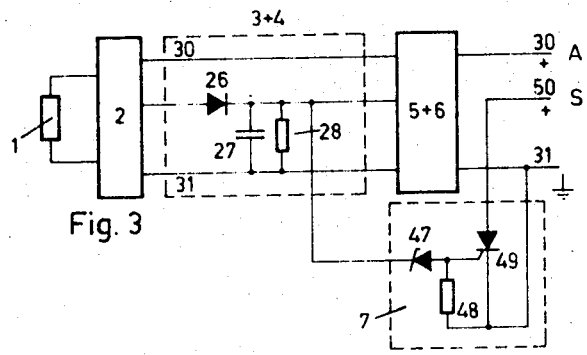
FIG. 3 is a schematic circuit diagram of the amplitude demodulator with a separate spurious signal indication.

The situation may arise that ambient, continuous, even or periodically recurring radiation is so strong that amplifier 2 becomes overloaded and begins to saturate. Thus, even if non-periodic radiation is applied, the amplifier 2 may have been so overloaded that its output signal is essentially representative only of the periodic signal. Thus, alarm can be blocked by very strong periodically recurring radiation which overloads the input amplifier. FIG. 3 illustrates a circuit in which blocking of the flame detector by strong noise radiation, periodically recurring, is indicated. Strong periodic radiation will appear at the output of the amplitude demodulator and be applied to a second threshold detector 7 (FIG. 3) which includes a Zener diode 47 connected between the output of the amplitude demodulator and the control electrode of an SCR 49. If the direct current voltage exceeds the Zener voltage, Zener diode 47 becomes conductive, SCR 49 fires and a separate signal line 50 supplies an additional control signal to the alarm center. A signal on line 50 will indicate that the flame detector is not in operative condition due to presence of masking strong periodic radiation.

Figure 4:
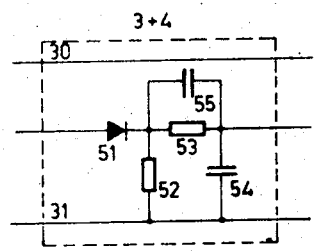
FIG. 4 is a schematic circuit diagram of a frequency independent amplitude demodulator.

FIG. 4 illustrates the circuit for another embodiment of an amplitude demodulator in which the pass band characteristics of the low-pass filter is in steps. This permits damping of the frequencies passed by amplifier 2 by a predetermined value. Diode 51 is again arranged at the input to circuits 3 and 4; the output of diode 51 is connected to a junction point which has a resistor 52 connected thereto, the other end of which is connected to bus 31; and an RC network formed of parallel connected resistor 53 and capacitor 55 connected to the junction. A further condenser 54 is connected to the output of the RC network and to bus 31. Condenser 54 and resistance 53 determine the upper frequency limit. Condensor 55 lowers the impedance of the network for higher frequencies. Strong, periodically recurring oscillations which exceed a predetermined value, occurring within the pass band width of amplifier 2 will thus be passed by the amplitude demodulator so that, again, saturation or overload of the amplifier 2 can be sensed and an alarm signal can be given indicating overloading of the amplifier and interference with the proper flame detection function.

Figures 5, 6:
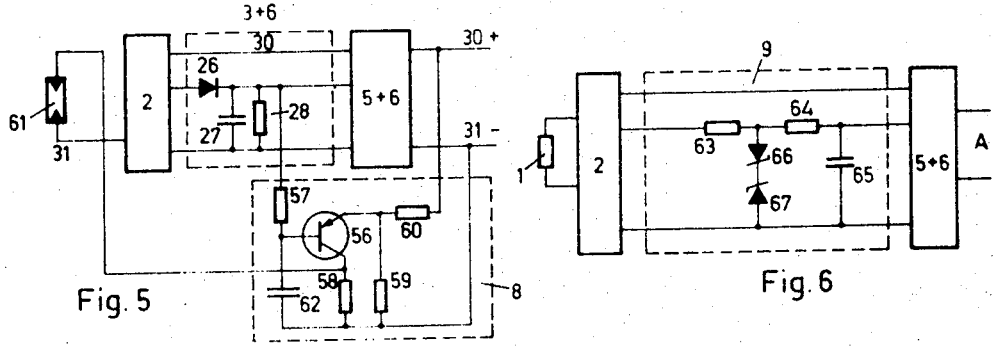
FIG. 5 is a schematic circuit diagram for an amplitude demodulator having automatic gain control (AGC)
FIG. 6 is a schematic circuit diagram of a frequency demodulator.

FIG. 5 illustrates a circuit in which overloading of the amplifier 2 by strong periodically recurring oscillations can be inhibited. Photosensitive resistor 61 is connected only at its negative side to the negative bus 31. The positive side of photosensitve resistor 61 is connected to a voltage divider formed of resistances 59, 60, transistor 56, and resistor 58. In ordinary condition, transistor 56 is conductive. The base of transistor 56 is controlled over a resistance 57 from the output of the amplitude demodulators 3 and 4. If the direct current voltage at the output of amplitude demodulator exceeds a certain voltage determined by the relative value of resistors 59, 60, and thus of the voltage at the junction point, that is at the emitter of treansistor 56, then the resistance of transistor 56 will rise and thus the supply voltage to the photo resistance 61 will decrease. Amplifier 2 will thus be supplied at a lower input voltage preventing its overloading. This automatic attenuating circuit (which functions in the order of an automatic gain control circuit) thus prevents blocking of the amplifier even by strong periodically occurring light pusles and still provides sufficient sensitivity for radiation derived from flames, even in the presence of high level periodically recurring radiation, although the sensitivity to flames is somewhat reduced.

The previously described examples are directed to a recognition network in which the irregularity, and random occurrence of radiation derived from flames is detected by amplitude demodulation. FIG. 6 illustrates a circuit utilizing a frequency demodulator 9 instead of the rectifier-low-pass filter combination 3, 4, forming the amplitude demodulator.

The output signals of the alternating current amplifier 2 are applied to frequency demodulator 9, which includes a resistor 63, and a series network of a pair of oppositely poled Zener diodes 66 and 67, to convert the output signals to square wave pulses. The frequency demodulation is then carried out on the flank of the signal being applied to a band pass filter formed of resistance 64 and condenser 65. The signal appearing at the output will have an amplitude which depends on the time the signal passes through zero, or null, and which can be further processed, as above described, in amplifier 5 and threshold detector 6. The side slope, that is the flank of the frequency characteristic of the low-pass filter is to be so selected that the center of the band pass characteristic is somewhat in the middle of the median pass frequency of amplfiier 2.

Other known methods of frequency demodulation may be used in combination with the flame detector of the present invention. The invention is not limited to detection by amplitude or frequency demodulation; any other system which permits separation, from a mixture of signals, of that portion which is irregular, and non-periodic, from other portions which are regular, periodic, can equally well serve to provide reliable indication of flames and thus provide a flame detector which is not subject to error indications and false alarms. The combination of rectifier 3 and filter 4, forming an amplitude demodulator, or of the frequency demodulator 9 may thus, broadly, be termed a discriminator which discriminates between regularly recurring components and randomly recurring components of applied signals.

The present invention has been illustrated and described in detail in combination with a flame detector to give a signal when a flame is detected; the circuit may, of course, be used in the converse; that is to indicate that a flame is absent, or extinguished (for example when a furnace flame is to be sensed). The control function, for example due to firing of the SCR 46 may be obtained in various ways, as well known in the art, for example by separate control of the SCR 46, by control of a separate circuit or the like; or by triggering other relay or other (for example solid state) devices to carry out suitable indicator, alarm, or control functions as desired. Thus, a signal derived at the output of Zener diode 44 can be applied to a control electrode of a switching transistor which, upon presence of the signal, is in non-conductive condition, and having its emitter-collector path connected similarly to the anode-cathode path of SCR 46. Upon absence of a flame, for example upon extinguishing of a flame in a furnace, the signal from the transistor will be removed, the transistor will become conductive, and heavier current supplying the emitter-collector path, for example over buses 30, 31 will indicate absence of a flame.

Various other output or indicator designs are possible as is well known in the art.

I claim:

1. Flame detector having photo-sensitive transducer means responsive to flame radiation, and an electrical recognition circuit connected to said transducer means, deriving its input signal therefrom, and producing an output signal representative of presence, or absence of a flame, said circuit comprising
means discriminating between regularly, periodically recurring components and randomly, non-periodically occurring components of the input signal applied to said recognition circuit by said transducer comprising
an amplitude detector providing an output representative of amplitude variations occurring in the output signal;
and means responsive to the detector output detecting randomly, non-periodically recurring components in the output within a predetermined frequency range;
said circuit providing said output signal when the predetermined low-frequency range, randomly occurring components exceed a pre-set value.

2. Flame detector according to claim 1, wherein said circuit comprises a band pass filter having a high frequency cut-off below 50 Hz.

3. Flame detector according to claim 1, wherein the pass range of the low-pass filter is between 2 and 40 Hz.

4. Flame detector according to claim 1, wherein the amplitude detector includes
an amplitude deomdulator providing an output representative of the ampltidue envelope of the input signal.

5. Flame detector according to claim 4, wherein the circuit comprises a bandpass filter having a frequency pass range of about 2–50 Hz and the amplitude demodulator includes low-pass filter means having a high-frequency cut-off below the low-frequency cut-off of the bandpass filter.

6. Flame detector according to claim 5, wherein the low-pass filter means has a high range cut-off in the order of 1 Hz or less.

7. Flame detector according to claim 6, including an RC network and a parallel resistance-capacity network connected, in parallel, to said RC network.

8. Flame detector according to claim 1, wherein the electrical recognition circuit comprises an integrator and a threshold detector connected to said amplitude detector.

9. Flame detector according to claim 4, wherein said amplitude demodulator includes a rectifier to provide an output signal therefrom which has a d-c and an a-c component;
and said circuit further comprises means sensing the level of said d-c component and indicating when said d-c level exceeds a predetermined value.

10. Flame detector according to claim 1, including power supply means for said transducer; and means controlling the power applied to said transducer as a function of the output signal.

11. Flame detector according to claim 9, including ower supply means for said transducer;
and means controlling the power applied to said transducer as a function of the output signal, said power supply means controlling the power applied to said transducer being responsive to said d-c component.

12. Flame detector according to claim 11, wherein said power supply control means comprises a transistor having said transducer connected in circuit with the emitter-collector path of the transistor;
and means controlling the conductivity of said transistor as a function of said d-c component.

13. Flame detector according to claim 1, wherein the discriminator means comprises a frequency discriminator.

14. Flame detector according to claim 13, wherein the frequency discriminator comprises a square wave pulse generating circuit and a circuit responsive to the flanks of the square wave pulses.

15. Flame detector according to claim 14, wherein the square wave pulse generating circuit comprises a pair of oppositely poled, series connected Zener diodes.

16. Flame detector according to claim 14, wherein the frequency discriminator comprises a low-pass filter providing an output amplitude representative of the rate of recurrence of pulses applied thereto.

17. Flame detector according to claim 8, wherein the integrator and threshold detector are set to provide an output signal if, and only if the output signal of said amplitude detector repsresentative of randomly occurring low-frequency components persist beyond a predetermined duration.

18. Flame detector according to claim 17, wherein said integrator and threshold detector includes a condenser; said rectifier being connected to charge said condenser with half waves of one polarity;
and said threshold detector detects the charge on said condenser.

19. Flame detector according to claim 18, wherein the threshold detector includes a thyristor controlled by the charge on said condenser;
and means detecting current flow through the anode-cathode path of said thyristor.

20. Flame detector having photosensitive transducer means responsive to flame radiation, and an electrical recognition circuit connected to said transducer means deriving its input signal therefrom and producing an output signal representative of the presence, or absence of a flame, said circuit comprising
means discriminating between regularly periodically recurring components and randomly non-periodically occurring components of the input signal applied to said recognition circuit by said transducer comprising an amplitude detector providing an output representative of amplitude variations occurring in the input signal;

and an amplitude demodulator providing an output representative of the ampltidue envelope of the input signal, and means responsive to said output providing a flame detection output signal when low-frequency, randomly occurring amplitude variations in the envelope exceed a pre-set value.

21. Flame detector according to claim 20, wherein the circuit comprises a bandpass filter having a frequency pass range of about 2–40 Hz and the amplitude demodulator includes low-pass filter means having a high-frequency cut-off below the low-frequency cut-off of the bandpass filter.

22. Flame detector according to claim 20, wherein the electrical recognition circuit comprises an integrator and a threshold detector connected to said amplitude detector.

23. Flame detector according to claim 20, wherein the amplitude demodulator includes a rectifier to provide an output signal therefrom which has a d-c and an a-c component;

and said circuit further comprises means sensing the level of said d-c component and indicating when said d-c level exceeds a predetermined value.

* * * * *